April 12, 1938.                W. F. BERCK                2,114,207
               AUTOMATIC SHUT-OFF MECHANISM FOR LIQUID METERS
                       Filed May 13, 1935          4 Sheets-Sheet 2
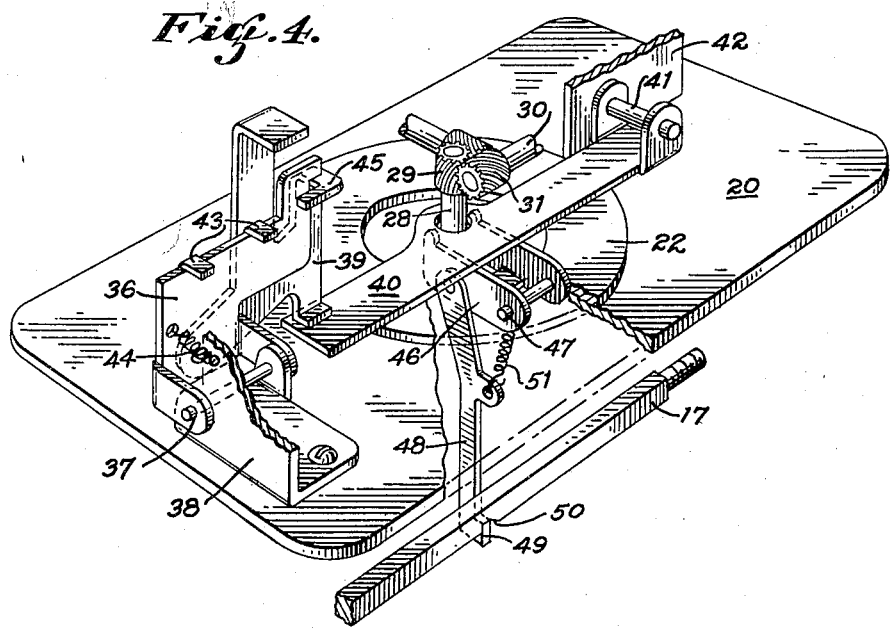
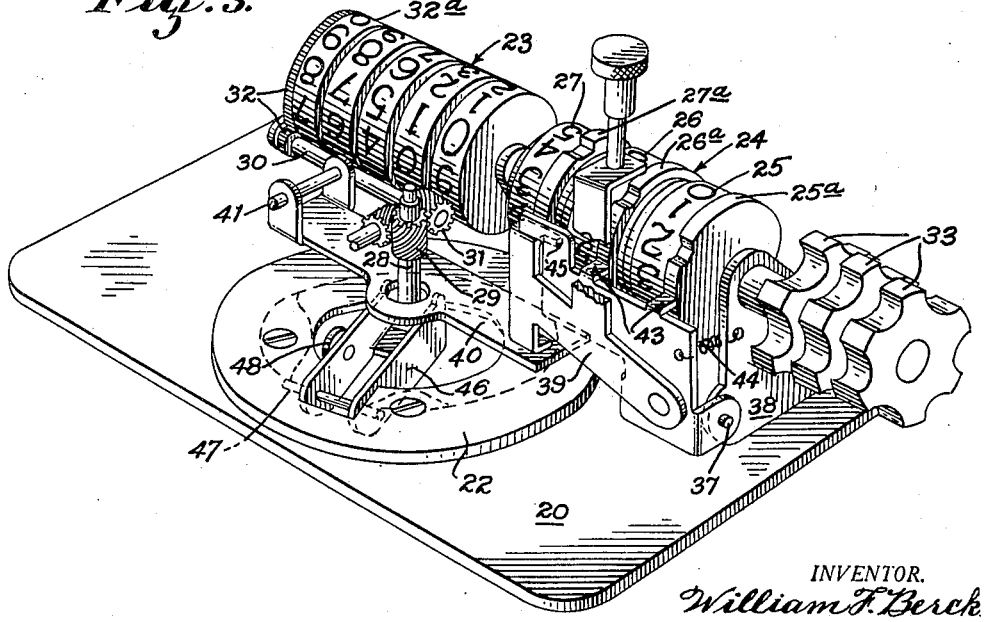
INVENTOR.
William F. Berck
BY Oscar A. Mellin
ATTORNEY.

April 12, 1938.  W. F. BERCK  2,114,207
AUTOMATIC SHUT-OFF MECHANISM FOR LIQUID METERS
Filed May 13, 1935    4 Sheets-Sheet 3
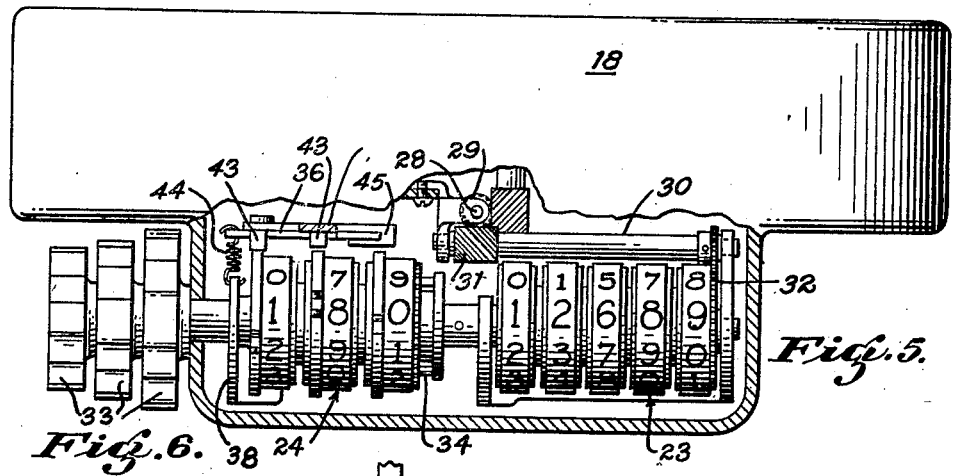
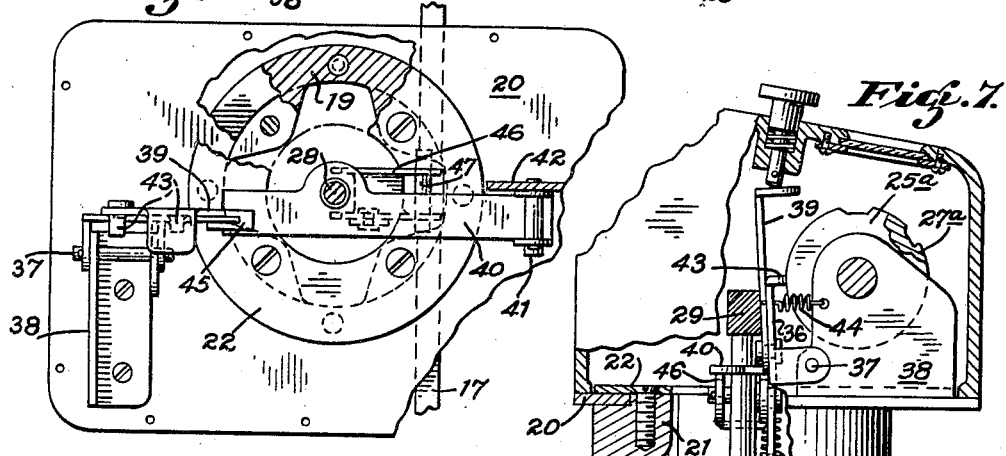
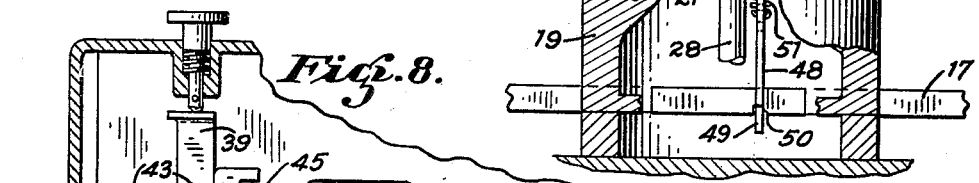
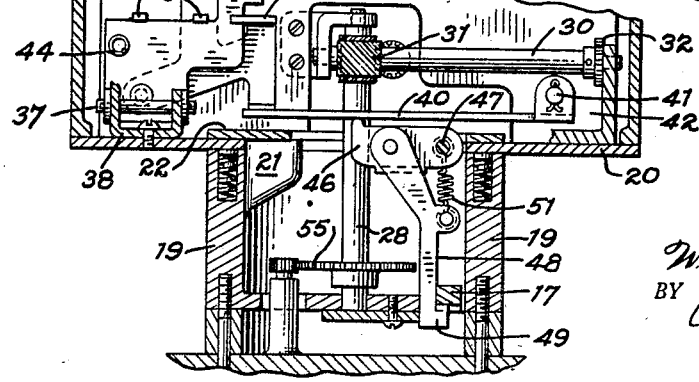
INVENTOR.
William F. Berck.
BY Oscar A. Mellin
ATTORNEY.

April 12, 1938.  W. F. BERCK  2,114,207
AUTOMATIC SHUT-OFF MECHANISM FOR LIQUID METERS
Filed May 13, 1935  4 Sheets-Sheet 4

INVENTOR.
William F. Berck
BY
Oscar A. Mellin
ATTORNEYS.

Patented Apr. 12, 1938

2,114,207

UNITED STATES PATENT OFFICE 2,114,207

AUTOMATIC SHUT-OFF MECHANISM FOR LIQUID METERS

William F. Berck, Oakland, Calif., assignor to Ralph N. Brodie Company, Oakland, Calif., a corporation of California Application May 13, 1935, Serial No. 21,197

6 Claims. (Cl. 221—101)

This invention relates to liquid meters and particularly pertains to automatic valve operating means controlled by the meter for operating a liquid shut-off valve automatically after a predetermined quantity of liquid has passed through the meter.

Prior to my invention, liquid meters have been equipped with a shutoff valve and an automatically operating mechanism associated with the counter mechanism for closing this valve after a predetermined quantity of liquid has passed through the meter.

It is the principal object of my present invention to provide an improved apparatus of the character referred to which is capable of use in connection with meters on which the counter head or unit is pivotally mounted so that it may be turned to any position with respect thereto.

One form which the invention may assume is exemplified in the following description and illustrated by way of example in the accompanying drawings, in which:

Fig. 3 is a perspective view of the trip mechanism and the counter mechanism which permits the valve to close after a predetermined quantity of liquid has passed through the meter.

Fig. 4 is a perspective view of the trip mechanism showing the manner in which it is associated with the valve latch bar.

Fig. 5 is a view in plan of the counter head with part of the casing thereof broken away and disclosing certain features of construction.

Fig. 6 is a view in plan of the tripping mechanism with parts broken away to disclose certain features of construction.

Fig. 7 is a fragmentary view in transverse section through the counter head disclosing the relationship of the tripping mechanism thereto.

Fig. 8 is a view in longitudinal section through the counter head with the counter mechanism removed in order to illustrate the construction of the tripping mechanism.

Figure 1:
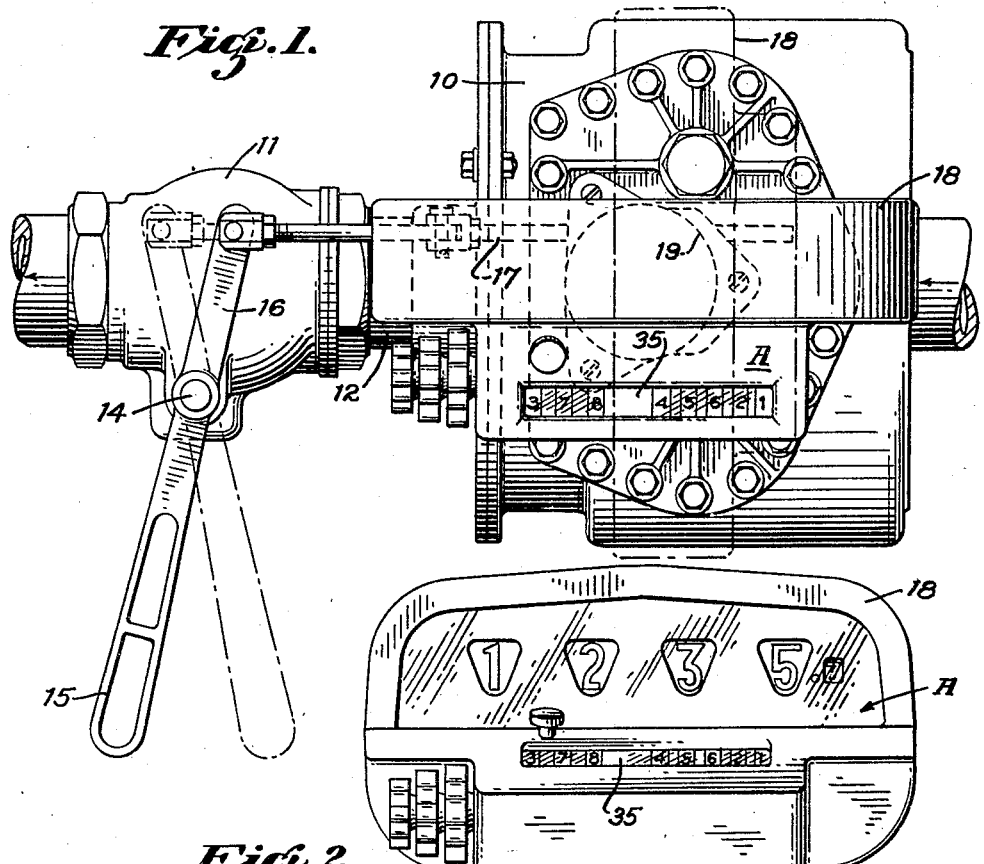
Fig. 1 is a plan view of a meter and valve assembly embodying my invention.
Figure 2:
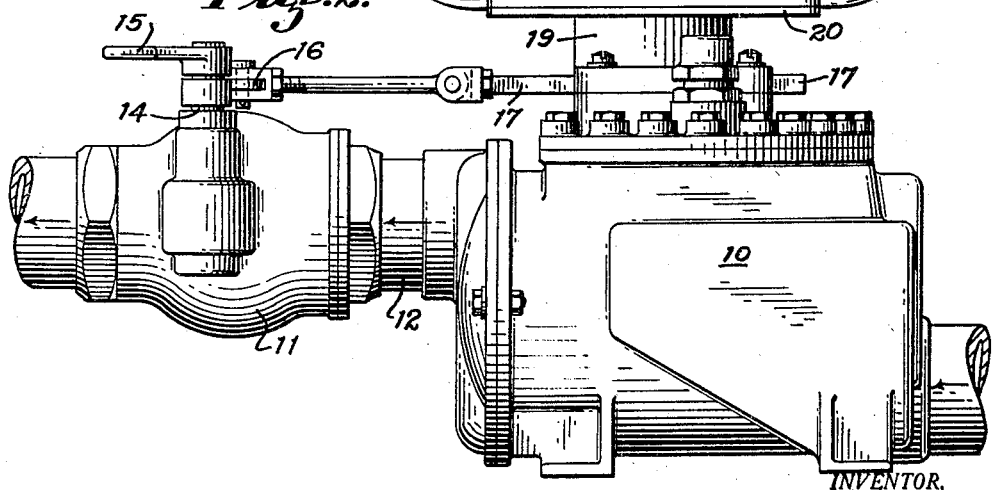
Fig. 2 is a side elevation of the same.

Referring more particularly to the accompanying drawings, 10 indicates a fluid meter, the discharge port of which is connected to a shut-off valve 11 by means of a pipe nipple 12. This valve 11 is of a conventional design in which the valve member is capable of opening and closing movement in a direction parallel to the flow of fluid through the valve, and which is normally held on its seat by means of an internal spring, not shown.

For opening the valve, the valve member is connected to a shaft 14 carried by the valve, turning movement of which in one direction will open the valve member against the spring. Connected with this shaft 14 is an operating handle 15 by means of which the shaft may be turned in a direction to open the valve. This operating handle 15 is fitted with a lever extension 16, the outer end of which is pivotally connected to a valve latch bar 17. It is my purpose that when the valve is opened by means of the handle 15 that the latch bar 17 be engaged by an automatic latch mechanism which will be hereinafter described and the valve will be held in open position until a predetermined quantity of fluid has passed through the meter, at which time the latch bar 17 will be released by the automatic latch mechanism and permit the valve spring to close the valve, shutting off further flow of fluid through the meter.

The automatic latch mechanism referred to is operatively associated with the counter mechanism of the meter. In this instance, the fluid meter is provided with a counter head A which includes a counter mechanism for indicating the volume of fluid passing through the meter, which counter mechanism is driven by the meter as in standard practice. In this instance the counter head A is swiveled on the meter so that it may be turned to any position thereon.

The counter head shown is housed in a casing 18 pivotally arranged on the meter. It is desirable for many reasons that the entire counter head be free to be revolved or turned on the meter. For this purpose the top of the meter is fitted with a hollow bearing 19 which is bolted or otherwise secured to the meter as illustrated with its axis arranged vertically.

The counter casing 18 is formed with a base plate 20 rotatably mounted on the top of the bearing 19. This plate 20 is formed with a circular opening, the edge of which engages the circular outer edges of guide lugs 21 formed concentrically on the bearing 19. A bearing ring 22 is secured to the top of these lugs 21 and overlies a portion of the base plate 20. It will thus be seen that the plate 20 is bearinged for rotating movement by the lugs 21 about the bearing 19 and is held in this position on the bearing 19 by the ring 22.

Referring more particularly to Fig. 3, it will be seen that mounted on the base plate 20 of the counter mechanism casing 18 is a counter mechanism 23 of a conventional design. This counter mechanism 23 consists, as illustrated, of a plurality of dial wheels numbered on their exterior surfaces to indicate gallons or other units of volumetric measure. Associated with this counter mechanism 23 is what I prefer to term a predetermining counter 24 which consists of three dial wheels 25, 26 and 27. The dial wheel 25 is fitted with a fixed trip disk 25a. The dial wheel 26 is fitted with a fixed trip disk 26a and the dial wheel 27 is fitted with a fixed trip disk 27a.

The counter mechanism 23 is positively driven by the meter from a meter driven central shaft 28 as will be seen in Figs. 3 and 8. The central shaft 28 is fitted with a helical gear 29, which drives a counter driver drive shaft 30 through a helical gear 31. The shaft 30 through the medium of a pinion and gear set 32 drives the last counter wheel 32a of the counter 23, which wheel through the means of conventional drive mechanism operates the remainder of the counter wheels or dials of the counter mechanism 23 as in conventional practice. This connection is such that the counter mechanism 23 will totalize the number of gallons that have been measured by the meter.

The dial wheels 25, 26 and 27 are fixed on separate concentrically arranged shafts, which are fitted with separate finger wheels indicated at 33 so that the dial wheels 25, 26 and 27 may be separately rotated manually to cause them to indicate any desired volume of fluid.

Figure 9:
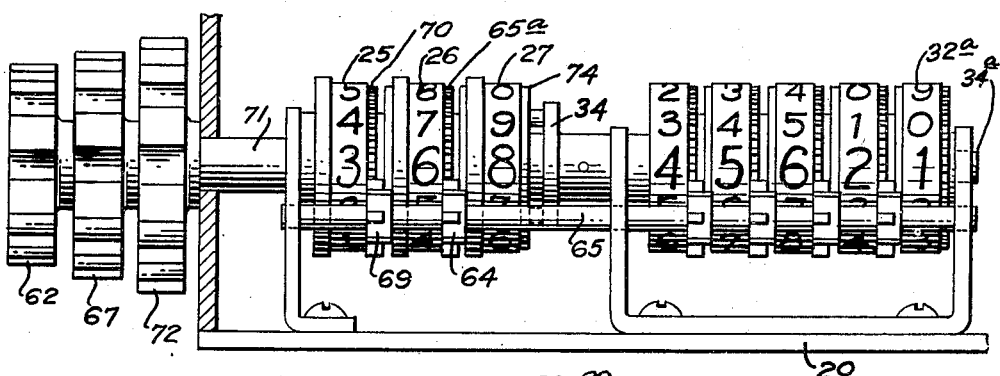
Fig. 9 is a view in elevation of the counting mechanism disclosed in Figs. 3 and 5.
Figure 10:
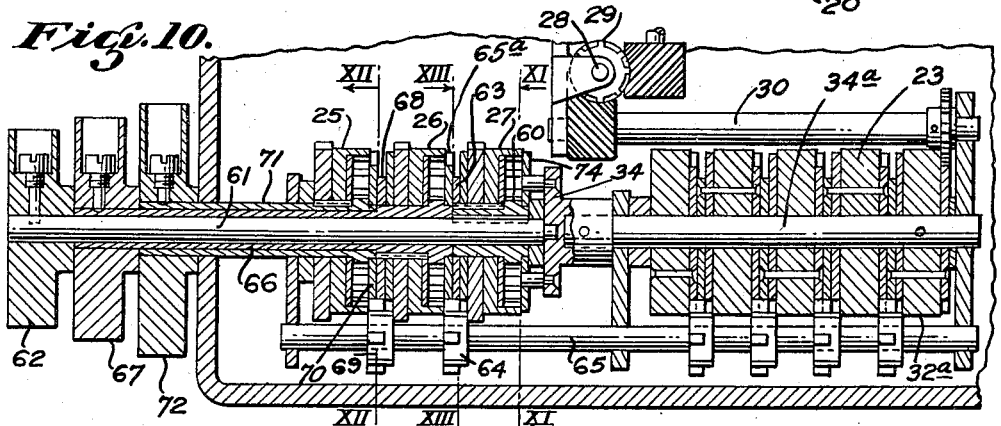
Fig. 10 is a view in longitudinal section through the counting mechanism shown in Fig. 9.

Reference being had to Figs. 9 and 10, it will be seen that the dial wheel 27 is the units wheel, the dial wheel 26 the tens wheel and the dial wheel 25 the hundreds wheel. The units wheel 27 is secured on a bushing 60 secured on the innermost shaft 61 to which is secured the finger wheel 62. Also secured on this bushing is a mutilated gear 63 adapted to mesh with a mutilated pinion 64 rotatably mounted on a counter shaft 65. Also in mesh with this mutilated pinion 64 is a spur gear 65a rotatably mounted on a tubular shaft 66 to which the finger wheel 67 is secured. Secured on this shaft 66 is the tens wheel 26 and its mutilated gear 68, which mutilated gear meshes with a mutilated pinion 69 rotatably mounted on the counter shaft 65. In mesh with this mutilated pinion 69 is a spur gear 70 rotatably mounted on the outer tubular shaft 71 to which the third finger wheel 72 is secured. Each of the units, tens and hundreds wheel is fitted with a fixed internal ratchet wheel 73.

Figure 11:
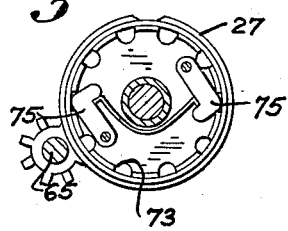
Fig. 11 is a transverse sectional view taken on line XI—XI of Fig. 10 in the direction of the arrows.
Figure 12:
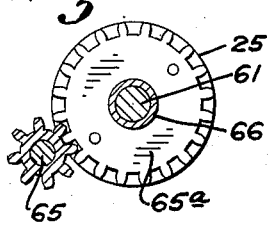
Fig. 12 is a sectional view taken on line XII—XII of Fig. 10.
Figure 13:
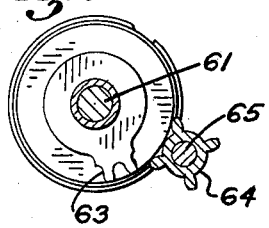
Fig. 13 is a sectional view taken on line XIII—XIII of Fig. 10.

Adjacent the units wheel and rotatable with respect thereto is a disk 74, to which disk the driving mechanism 34 is secured. This driving mechanism is driven by the shaft 34a which is driven with the units wheel of the conventional counter 23, so that when the conventional counter 23 is driven, the disk 74 will revolve therewith. This disk 74 carries two pivotal pawls 75 which engage the internal ratchet gear 73 of the units wheel 27 and imparts a drive thereto. This drive is transmitted to the shaft 61 and consequently to the mutilated gear 63, which in turn drives the mutilated pinion 64. This mutilated pinion in turn drives the spur gear 65a carrying similar pivotal pawls 75 as shown in Fig. 11, which engage the internal ratchet wheel 73 fixed in the tens wheel 26. The ratio is such that upon each complete revolution one-tenth of a revolution will be imparted to the tens wheel, the operation, of course, being intermittent. When the tens wheel 26 is driven, it will drive the hollow shaft 66, which in turn will drive the mutilated gear 68 and through the mutilated pinion 69 drive the spur gear 70, the ratio here likewise being intermittent so as to drive the hundreds wheel one-tenth of a revolution each time the tens wheel makes one complete revolution. The spur gear 70 likewise carries the pawls 75 to impart a drive to the hundreds wheel 25, the ratio being ten to one and intermittent so that upon each complete revolution of the tens wheel 26, the hundreds wheel will be revolved one-tenth of a revolution.

It is therefore seen that when the meter is in operation, the shaft 30 will be revolved which will revolve the units wheel 32a of the conventional counter 23, which in turn drives the shaft 34a. This shaft will drive the units wheel 27 of the predetermining counter in a direction that the pawls 75 will be effective in operating the units wheel 27. It is obvious, however, that if the shaft 34a is revolved in the opposite direction, no drive will be imparted to the units wheel 27 of the predetermining counter because the pawls will be ineffective in imparting a drive thereto. Therefore, should the counter head be turned clockwise, it will unaffect the operation of the predetermining counter inasmuch as no drive will be imparted thereto. It is obvious that to set the predetermining counter, that the finger wheels 62, 67 and 72 may be independently turned in the direction in which the pawls 75 are ineffective.

When the meter is in operation, the predetermining counter 24 operates in the same manner as the conventional counter 23, being driven by a driving mechanism indicated at 34. The numerals on the dial wheels of the predetermining counter are arranged in a reverse order with respect to the numerals on the conventional counter as shown in Fig. 3 of the drawings. Therefore, if it is desired to deliver 123 gallons of fluid, the finger wheels 33 are manipulated to position the dial wheels 25, 26 and 27 of the predetermining counter 24 to place the numeral 1 on the dial 25, the numeral 2 on the dial 26 and the numeral 3 on the dial 27 in indicating position which is aligned with the sight opening 35 in the counter mechanism casing 18. With the dial wheels of the predetermining counter set to read 123, the entire counting mechanism commences to operate upon the opening of the valve and the flow of fluid through the meter. As the numbers on the dial wheels of the predetermining counter are arranged in reverse order, they will gradually approach a reading of zero and when all three indicate zero, this will indicate that exactly 123 gallons have passed through the meter. When the zeros on the three dial wheels of the predetermining counter align and register with the sight opening 35, the automatic trip mechanism becomes effective to permit the valve to close.

This automatic trip mechanism, in addition to the predetermining counter 24, includes a trip member 36 mounted within the casing 18 and lying along the inner side of the dial wheels of the predetermining counter 24. This trip member 36 is pivoted as at 37 to a bracket 38 which is a fixed part of the base plate 20. This pivotal mounting of the trip member 36 enables its upper edge to swing in a direction which is substantially radial relative to the dial wheels of the predetermining counter 24. The trip member 36 has a pivotal part 39 which is pivoted thereto for pivotal movement in a vertical plane. The free end of this pivotal part 39 bears on the free end of a trip bar 40 which is pivoted at its opposite end as at 41 to a fixed part 42 of the base plate 20. This pivotal mounting of the latch bar 40 enables its free end to swing in a vertical plane.

The trip member 36 is formed at its upper end with two fingers 43 which are inturned toward the axis of the dial wheels of the predetermining counter 24. One of the fingers 43 registers with the trip disk 25a of the dial wheel 25 while the other finger 43 aligns with the trip disk 26a of the dial wheel 26. A spring 44 engages the trip member and constantly tends to move the fingers 43 inwardly toward the axes of the disks 25a and 26a and keep them in constant engagement with the peripheral edges of these disks. The pivotal part 39 of the trip member 36 is provided with an inturned finger 45 which is in alignment with the trip disk 27a of the dial wheel 27 of the predetermining counter 24, and the spring 44, of course, constantly tends to move the inturned finger 45 of the trip member 39 toward the axis of the disk 27a. It will be noticed from Fig. 4 that the inturned finger 45 is slightly elevated with respect to the fingers 43 of the actuator 36.

It will be noticed that each of the disks 25a, 26a and 27a are formed with a notch in its periphery and when these three notches are in longitudinal alignment and in alignment with the fingers 43, the three dial wheels 25, 26 and 27 will indicate zero. In this position the pivotal part 39 of the trip member 36 will be depressed due to the fact that the finger 45 has engaged the notch in the disk 27a prior to the dial 27 reaching zero so that as the latter reaches zero, the continued movement of the disk 27a will move the free end of the pivotal part 39 of the trip member 36 downwardly. This movement of the trip member will be accompanied by downward movement of the free end of the trip bar 40, which movement will be accompanied by release of the latch bar 17. This is accomplished by the provision of a trigger 46 which is pivotally secured to the bearing 19 so that it will not revolve with the counter head or unit. This trigger is bifurcated and arranged with its arms on diametrically opposite sides of the counter drive shaft 28 which is arranged coaxially of the bearing 19 and on the axis about which the counter head or unit revolves. The trigger 46 swings in a vertical plane and its pivotal point 47 is eccentric to the shaft 28. The free ends of the arms of the trigger are formed with upraised portions to engage the underside of the trip bar 40 at diametrically opposite sides of the shaft 28.

Pivotally connected to the trigger 46 adjacent its free end and depending therefrom is a latch finger 48 having a hooked portion 49 disposed to engage a notch 50 in the underside of the latch bar 17. A spring 51 is provided which tends to hold the free end of the trigger 46 in its uppermost position and holding the hooked end 49 of the latch finger 48 in its uppermost position engaging the notch 50 in the latch bar 17. Consequently, as the trigger 46 engages the underside of the latch plate 40, the free end of the latter will be held in its upraised position. In this position it is engaged by the trip member 39 so that when the latter is depressed by engagement of the notch in the disk 27a and continued movement of the dial wheel 27, the free end of the trip bar 40 will be depressed, moving the free ends of the trigger 46 downwardly. This will be accompanied by downward movement of the latch finger 48 sufficiently to disengage its hooked end 49 from the notch 50 in the latch bar 17, thus releasing the latter. When the latter is released, the spring of the valve 11 will cause the valve member thereof to seat, shutting off further flow of fluid through the meter.

It is desired to point out here that this operation will be performed regardless of the position of the counter head or unit with respect to the meter and latch bar 17. That is to say, that the entire counter casing 18 together with the mechanism contained therein may be swung to any position about the axis of the bearing 19 on the meter without disturbing the operative relation between the automatic trip mechanism and the latch bar 17. This is obvious from Fig. 4 where it will be seen that should the plate 20, which is a fixed portion of the counter casing 18, be swung about the axis of shaft 28, that the entire trip mechanism with the exception of the trigger 46 and the latch finger 48 will move about the axis of the shaft 28, but at the same time the trigger bar 40 will remain in the same operative relation to the trigger 46. This is likewise true of the predetermining counter drive members due to the fact that the predetermining counter drive is accomplished through the helical gears and ratchet mechanism previously described.

In operation of the apparatus, it is constructed and assembled as illustrated and described, and assuming that the valve 11 is closed and it is desired to have the meter deliver a certain quantity of fluid, the finger wheels 33 are manipulated so that the certain quantity desired to be delivered will be indicated on the predetermining counter 24. For the purposes of description let it be assumed that this amount is 123 gallons. The innermost wheel 33 is turned until the numeral 1 is indicated thereby. The middle wheel 33 is then turned until the dial wheel 26 indicates the numeral 2. The outermost finger wheel 33 is then turned until the dial wheel 27 indicates the numeral 3. The valve 11 is then opened by manual operation of the handle 15 and inasmuch as the notches in the disks 25a, 26a and 27a will be out of register with the fingers 43 and 45, the spring 51 will be urging the hooked end 49 of the latch finger 48 upwardly. As the valve 11 is opened by manual operation of the handle 15, the notch 50 in the latch bar 17 will align with the hooked end 49 of the latch finger 48 and the hooked end 49 will engage the notch 50 and prevent the spring of the valve 11 from seating the valve member. The meter will then commence operating and its operation will be accompanied by operation of the shaft 28 due to the geared connection 55 illustrated in Fig. 8. Operation of this shaft will be accompanied by operation of the counting mechanisms 23 and 34 as previously described. As the dial wheels 25 and 26 indicate zero, the notches in the disks 25a, 26a and 27a will align with the fingers 43 and 45 and the trip member will be moved by the spring 44 about its pivotal point 37 to cause the fingers 43 to engage the notches in the disks 25a and 26a. After the fingers 43 have projected into the notches 26a, the finger 45 is free to engage the notch in the disk 27a. Due to the fact that this engagement will take place just prior to the dial wheel 27 reaching zero, downward movement of the pivotal part 39 of the trip member 36 will result. This downward movement of the trip member will be accompanied by depressing of the trip bar 40 which in turn will cause operation of the trigger 46 and consequently disengagement of the hooked end 49 of the latch finger 48 from the notch 50 of the latch bar 17. The minute that the hooked end 49 of the latch finger 48 disengages from the notch 50, the spring of the valve 11 will cause the valve member therein to seat, shutting off further operation of the meter.

As previously described, the counter head or unit in the casing 18 may be swung to any angular position on the meter at any time without requiring adjustment of or in any manner disturbing the operativeness of the automatic trip mechanism.

With the apparatus which I have here described, any quantity of fluid may be accurately delivered, and while I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In combination with a liquid meter, a pivotal counter head mounted thereon, a counting mechanism included in said counter head, meter actuated gearing for operating the counting mechanism, said gearing extending into the head along the axis of pivotal movement of the latter and permitting rotation of the head in one direction, a shut-off valve connected with the discharge port of the meter, and automatic means controlled by said counting mechanism for effecting closing of said valve when a predetermined volume of liquid has passed through the meter.

2. In combination with a liquid meter and a spring-closed valve controlling liquid flow through the meter, a counter head pivotally mounted on the meter, a counting mechanism included in said counter head, meter actuated gearing for operating the counting mechanism, said gearing extending into the head along the axis of pivotal movement of the latter and permitting rotation of the head in one direction, means for holding said valve in an open position, and automatically operating means controlled by the counting mechanism for releasing said holding means when a predetermined volume of liquid has been metered.

3. In combination with a liquid meter and a valve controlling liquid flow through the meter, a counter head pivotally mounted on the meter, a counting mechanism in said counter head, meter actuated gearing for operating the counting mechanism, said gearing extending into the head along the axis of pivotal movement of the latter and permitting rotation of the head in one direction, means for setting said counting mechanism to indicate a desired volume of liquid, and automatically operating means controlled by said counting mechanism and effecting closing of said valve when the volume of liquid indicated on the counting mechanism has passed through the meter.

4. In combination with a liquid meter and a spring-closed valve controlling liquid flow therethrough, spring means constantly tending to maintain said valve closed, latch mechanism for latching said valve in open position, a counter head pivotally mounted on the meter and free for turning movement thereon, a counting mechanism included in said counter head, meter actuated means operating the counting mechanism and extending into the head along the axis of pivotal movement of the latter for permitting rotation of the head in one direction, a trip mechanism carried by, and rotatable with, the said head and operatively associated with said latch mechanism, and means controlled by the counting mechanism for actuating said trip mechanism to release said latch mechanism whereby to free the valve for closing movement.

5. In combination with a liquid meter and a spring-closed valve controlling liquid flow therethrough, a latch bar connected with said valve, latch means associated with said bar to latch the same in a position holding the valve open, a counter head swiveled on the meter, a manually set counter mechanism included in said counter head, automatically operating trip mechanism controlled by said counter mechanism for releasing said latch mechanism to free the valve for closing movement, and meter actuated means for operating the counter mechanism and extending into the counter head along the axis of swiveling movement of the latter for permitting one-way rotation of the head and the parts carried thereby.

6. In combination with a liquid meter, a shut-off valve connected to the discharge port thereof, spring means normally tending to maintain said valve closed, means for latching the valve in open position, a counter head pivotally mounted on the meter, a counting mechanism included in the counter head having means by which it may be manually set, meter actuated gearing for operating the counting mechanism, said mechanism extending into the head along the axis of pivotal movement of the latter, and means in, and movable with, the head and operatively associated with the latching means to release the latter for closing the valve, said last named means being also operatively associated with, and controlled by, the counting mechanism.

WILLIAM F. BERCK.